(12) United States Patent
Chen et al.

(10) Patent No.: US 8,121,067 B2
(45) Date of Patent: Feb. 21, 2012

(54) QUALITY OF SERVICE PROVISIONING USING PERIODIC CHANNEL TIME ALLOCATION

(75) Inventors: Richard Y. Chen, Croton-on-Hudson, NY (US); Javier Del Prado Pavon, Mougins (FR); Sai Shankar Nandagopalan, San Diego, CA (US); Karl Wittig, New York, NY (US); Chun-Ting Chou, Briarcliff Manor, NY (US); Ruediger Schmitt, Maplewood, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1027 days.

(21) Appl. No.: 11/908,055

(22) PCT Filed: Mar. 8, 2006

(86) PCT No.: PCT/IB2006/050730
§ 371 (c)(1),
(2), (4) Date: Sep. 7, 2007

(87) PCT Pub. No.: WO2006/095322
PCT Pub. Date: Sep. 14, 2006

(65) Prior Publication Data
US 2008/0186905 A1    Aug. 7, 2008

Related U.S. Application Data

(60) Provisional application No. 60/659,613, filed on Mar. 8, 2005.

(51) Int. Cl.
*H04B 7/212*    (2006.01)

(52) U.S. Cl. ............... 370/321; 370/328; 370/326
(58) Field of Classification Search .............. 370/328, 370/252, 311, 395.4
See application file for complete search history.

(56) References Cited

U.S. PATENT DOCUMENTS

| 5,594,738 | A  | 1/1997  | Crisler |
| 2002/0105970 | A1 | 8/2002 | Shvodian |
| 2004/0131019 | A1 | 7/2004 | Kandala |
| 2004/0190467 | A1 | 9/2004 | Liu |
| 2004/0264397 | A1 | 12/2004 | Benveniste |

(Continued)

FOREIGN PATENT DOCUMENTS
WO    2004034644 A2    4/2004

OTHER PUBLICATIONS

Fan, Wing F. et al., "Admission Control for Variable Bit Rate Traffic Using Variable Service Interval" IEEE 802.11e WLANs, Oct. 2004.

(Continued)

*Primary Examiner* — Ricky Ngo
*Assistant Examiner* — David Oveissi
(74) *Attorney, Agent, or Firm* — Larry Liberchuk

(57) ABSTRACT

To maximize power saving performance without compromising on the QoS requirement of an application stream, a method and wireless network device generates a subset of a periodic service interval can be used for medium time allocation and data and information can be transmitted in contiguous medium time allocated this way. This selection of a period of time below service capacity allows multiple applications access the medium and for the selection of contiguous medium time during which data transmission can occur.

5 Claims, 3 Drawing Sheets

U.S. PATENT DOCUMENTS

2005/0047357 A1    3/2005   Benveniste
2006/0067325 A1*   3/2006   Kounavis et al. .......... 370/395.4

OTHER PUBLICATIONS

Ansel, Pierre et al., "An Efficient Scheduling Scheme for IEEE 802.11e", IEEE Modeling and Optimization in Mobile, Ad Hoc and Wireless Networks Workshop, Mar. 2004.

Skyrianoglou, Dimitris et al., "Traffic Scheduling in IEEE 802.11e Networks based on Actual Requirements", Mobile Venue 2004.

Grilo, A. et al., A Scheduling Algorithm for QOS Support in IEEE 802.11e Networks, IEEE Wireless Communications, No. 10, No. 3, Jun. 2003.

\* cited by examiner

QUALITY OF SERVICE PROVISIONING USING PERIODIC CHANNEL TIME ALLOCATION

This Application claims the benefit of priority from prior U.S. application 60/659,613, filed Mar. 8, 2004, the teachings of which are herein incorporated by reference.

The wireless communication bandwidth has significantly increased with advances of channel modulation techniques, making the wireless medium a viable alternative to wired and optical fiber solutions. As such, the use of wireless connectivity in data and voice communications continues to increase. These devices include mobile telephones, portable computers in wireless networks (e.g., wireless local area networks (WLANS), as well as audio/visual streaming, video/audio telephony, stationary computers in wireless networks, and portable handsets, to name only a few.

Each wireless network includes a number of layers and sub-layers, such as the Medium Access Control (MAC) sub-layer and the Physical (PHY) layer. The MAC layer is the lower of two sublayers of the Data Link layer in the Open System Interconnection (OSI) stack. The MAC layer provides coordination between many users that require simultaneous access to the same wireless medium.

The MAC layer protocol includes a number of rules governing the access to the broadcast medium that is shared by the users within the network. As is known, several different multiple access technologies (often referred to as MAC protocols) have been defined to work within the protocols that govern the MAC layer. These include, but are not limited, to Carrier Sensing Multiple Access (CSMA), Frequency Division Multiple Access (FDMA) and Time Division Multiple Access (TDMA).

While standards and protocols have provided for significant improvement in the control of voice and data traffic, the continued increase in the demand for network access at increased channel rates while supporting quality-of-service (QoS) requirements have required a continuous evaluation of protocols and standards and changes thereto. For example, many known protocols such as the WiMedia Ultra-Wide Band (UWB) MAC 1.0 (published as ECMA standard 368) and other non-slot based WLANs such as IEEE 802.11, require that QoS requirements from applications are passed down to lower layers of networking stack in terms of the Traffic Specifications (TSPEC) of the application stream. Upon receiving the TSPEC of the application stream, lower layers such as the MAC allocate resource to serve the traffic stream to meet the QoS requirements. In various MAC protocols, one such resource is the airtime available for transmission of data or other information. QoS provisioning in these wireless MAC protocols usually involves allocation of airtime according to a QoS requirement specified, for example, in the TSPEC. For example, in slot-based MAC protocol, such as the WiMedia UWB MAC, there are various ways to allocate media access slot (MAS) (i.e., medium access time) that result in performance differences in delay, power saving, etc.

Allocation of contiguous blocks of airtime for data or airtime transmission can lead to large maximum service intervals for an application stream. This may result in a large scheduling latency, or delay bound. However, evenly distributed, smaller time allocation for data transmission over the course of a superframe requires the transmission device to "wake up" frequently. This leads to poor power-saving performance. Additionally, too many smaller distributed fragments of time allocation over the course of a superframe may also not enable successful transmission of an entire packet especially at the end of each fragment. This may result in poor bandwidth efficiency.

What is needed, therefore, is a method and system that substantially overcomes at least the shortcomings of known methods described.

In accordance with an example aspect, a method of transmitting information over a wireless network includes the steps of: determining a maximum periodic service interval allowed based on a transmission specification (TSPEC) including a latency requirement, and local resource; normalizing the maximum periodic service interval to generate a normalized periodic service interval; determining a continuous period of medium access time within the normalized periodic service interval; and transmitting data within the medium access time.

In one embodiment, the normalizing step includes dividing the superframe by the smallest integer that allows the normalized periodic service interval to be less than or equal to the maximum periodic service interval In one embodiment, the normalizing step includes dividing the superframe by the smallest integer that is $2^n$ where n={0 . . . ∞} and allows the normalized periodic service interval to be less than or equal to the maximum periodic service interval and select such an integer In another embodiment, the step of determining a period service interval includes: determining a maximum periodic service interval allowed for each application stream based on its TSPEC, latency requirement, and local resource for each stream; and selecting the minimum of maximum periodic service intervals determined for all application streams.

Additionally, in one aspect a wireless network includes: a plurality of wireless devices. Each wireless device includes: a transmitter for transmitting a signal; a receiver for receiving the signal; a processor; and a power source. The processor determines a periodic service interval based on a TSPEC, a latency requirement, and local resource of the device; normalizes the maximum periodic service interval to generate a normalized periodic service interval; determines a continuous period of medium access time within the normalized periodic service interval; and instructs the transmitter to transmit data of the application stream within the medium access time periodically with the normalized service interval.

The invention is best understood from the following detailed description when read with the accompanying drawing figures. It is emphasized that the various features are not necessarily drawn to scale. In fact, the dimensions may be arbitrarily increased or decreased for clarity of discussion.

Figure 1:
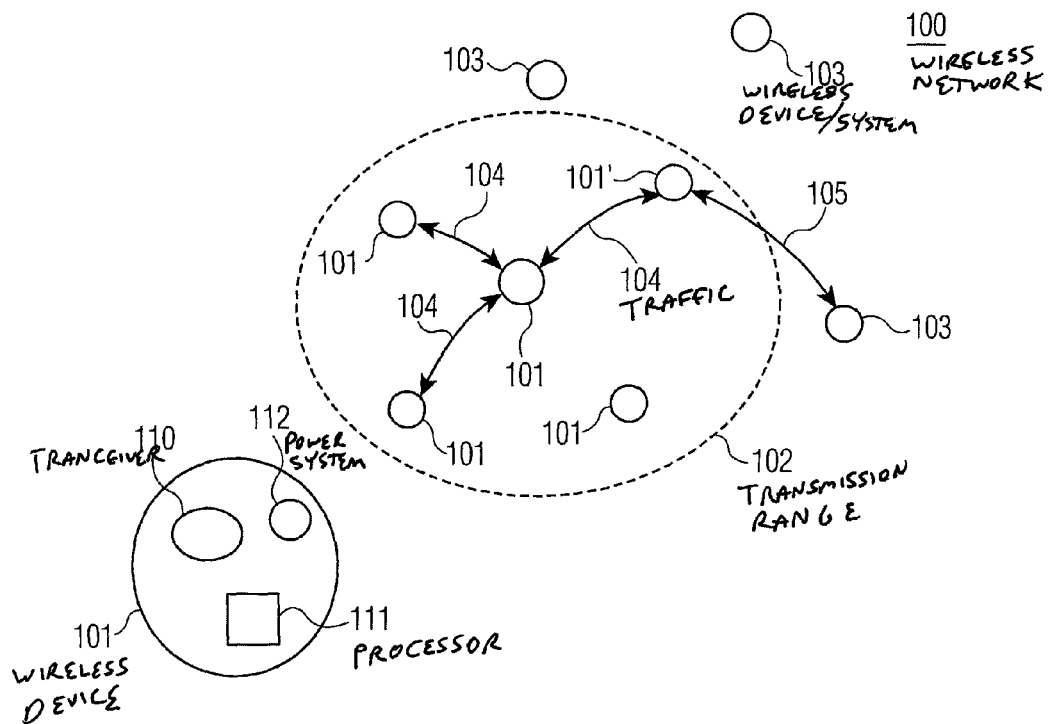
FIG. 1 is a diagram representative of wireless communication network system sharing a medium in accordance with an example embodiment.

In the following detailed description, for purposes of explanation and not limitation, example embodiments disclosing specific details are set forth in order to provide a thorough understanding of the example embodiments. However, it will be apparent to one having ordinary skill in the art having had the benefit of the present disclosure that other embodiments that depart from the specific details disclosed herein. Moreover, descriptions of well-known devices, methods, systems and protocols may be omitted so as to not obscure the description of the present invention. Nonetheless, such devices, methods, systems and protocols that are within the purview of one of ordinary skill in the art may be used in accordance with the example embodiments. Finally, wherever practical, like reference numerals refer to like features.

Briefly, in accordance with illustrative embodiments, methods and system are described that improve the efficiency and throughput in a distributed wireless network. The methods and system calculate the maximum service interval that will meet the delay requirement and TSPEC of one or more application streams. This is accomplished, for example, by allocating contiguous MAS (i.e., portions of media access time) to minimize power loss due to numerous "wake-up" operations.

In accordance with the example embodiments described herein, distributed (i.e., slot-based) wireless networks operate under WiMedia MAC 1.0. Of course, this is merely illustrative, and other MAC protocols may incorporate the sharing of availability of the devices within the network that are described in connection with the example embodiments. These include, but are not limited to, the progeny of the current WiMedia MAC protocol, as well as other carrier sense multiple access with collision avoidance (CSMA/CA) protocols or Time Division Multiple Access (TDMA) protocols. Additionally, the embodiments described herein may also apply to WLANs having non-slot based media access, such as IEEE 802.11 WLAN. It is emphasized that these protocols are merely illustrative and that other protocols within purview of one of ordinary skill in the art may be implemented in accordance with the example embodiments.

FIG. 1 is a schematic diagram of a wireless network system that includes plurality of wireless devices or systems sharing a communications medium (i.e., co-existing) in accordance with an example embodiment. Wireless devices/systems 101 may transmit or receive (or both) traffic 104 to from other wireless devices 101 within their transmission range 102. Moreover, there may be other wireless devices/systems 103 that are outside the range 102 of certain wireless devices/systems 101, but within the range of certain devices 101'. Wireless devices 101 contain a transceiver 110 (e.g., any known transmitter/receiver combination, or a separate transmitter and receiver), a processors 111 (e.g., any known device which processes bits of information), and a power source 112 (e.g., a battery).

Figure 2:
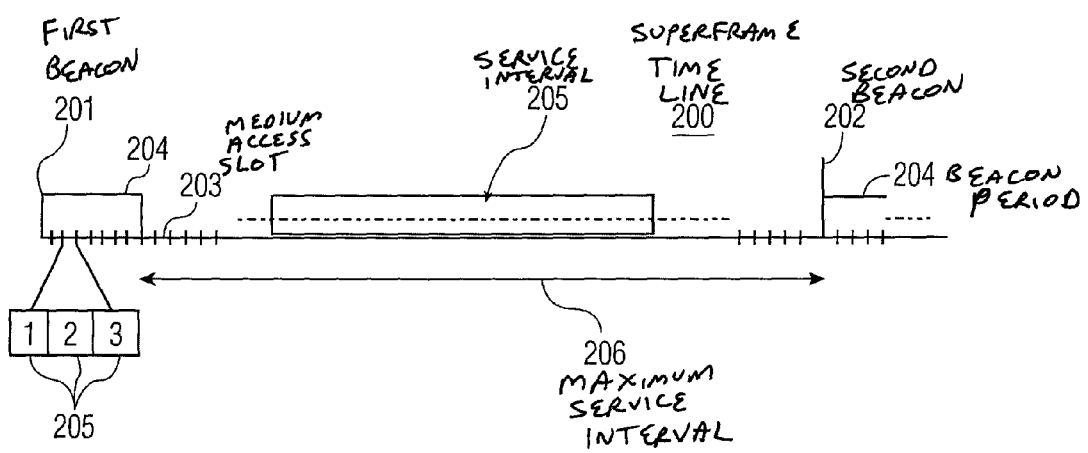
FIG. 2 is a time-line of a superframe in accordance with an example embodiment.

FIG. 2 is a time line 200 of a superframe between a first beacon 201 and a second beacon 202. As used herein, the starting point of the beacons is referred to as the Beacon Period Start Time (BPST), and there is a prescribed period of time between beacons. In an example embodiment, the superframe is divided into a plurality of medium access slots (MAS) 203, which provide for organized transmission and reception in keeping with the example embodiments. In an illustrative embodiment, there are 256 slots 203, with each slot having a duration of approximately 256 μs, so the entire duration of the superframe is approximately 65.536 ms in the example embodiment (thus 65.536 ms between BPSTs). Of course the number and duration of the slots 203 is merely for purposes of illustration and are in no way limitations of the slots 203.

At the beginning of each superframe there is a beacon period 204. As will become clearer as the present description continues, the beacon period 204 provide the vehicle for the sharing of availability information of the devices/systems (e.g., devices 101, 103) of the network 100, as well as the needs of devices/systems to send traffic to other devices/systems of the wireless network 100 of the example embodiments.

After the beacon period 204 is data transfer period 206 that may contain a plural of service intervals 205 for a plural of application streams. Each service interval comprises a certain number of slots. Different application streams require different numbers of slots 203 to ensure adequate medium access for complete packet transmission. A processor in a transmitter determines how much of the service interval it requires to transmit its data packets. This determination occurs by analyzing TSPEC of the application stream including the bandwidth requirement, delay requirement, and local resource. Additionally, service intervals are periodic (i.e., occurring over several cycles of beacon period 204 and service interval 205, or simply superframes.).

To calculate the periodic service interval, a processor (e.g., processor 111 in FIG. 1) calculates a service rate g according to a TSPEC and local resource, such as, for example, available medium time and buffer space required by a transmitter to transmit its data within the MAC in which it operates. The processor also calculates the queuing delay $d_q$ caused by burstiness of the application stream (measured as burst size field in TSPEC) by using the calculated g. The maximum service interval 206 using the disclosed periodical medium access allocation can be calculated based on the delay requirement, for example, as follows:

$$SI \leq d_s - d_q$$

where $d_s$ is the delay requirement and $d_q$ is the additional queuing delay caused by the burstiness of the application stream.

Figure 4:
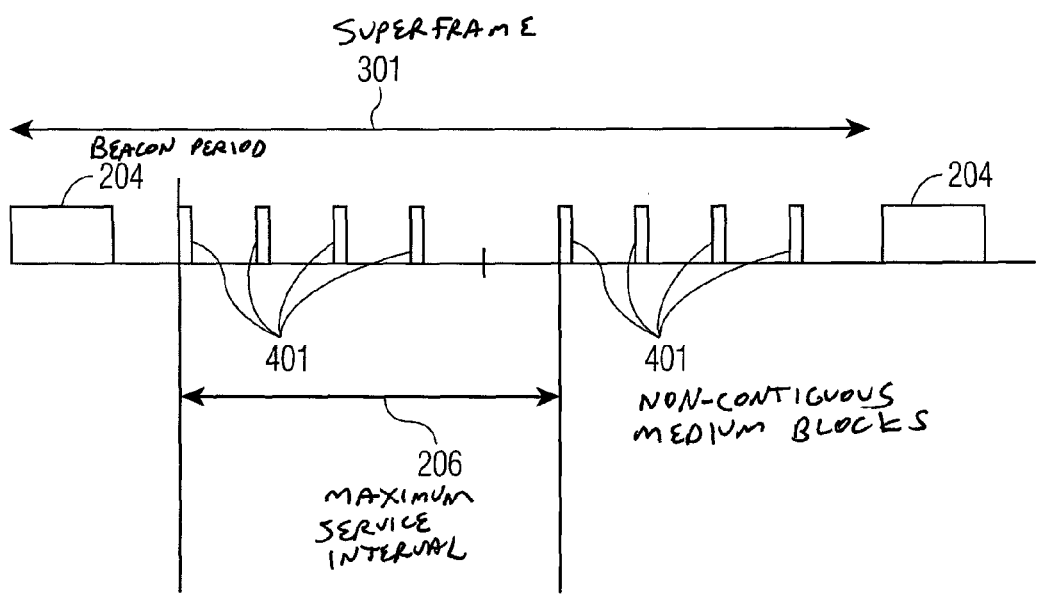
FIG. 4 is a superframe with data transmitted over many non-contiguous MAS.

This periodic service interval 205 represents a series of medium blocks during which a transmitter can transmit data. FIG. 4 depicts a service interval 205 during which medium access is provided over several non-contiguous medium blocks 401. A transmitter (e.g., transceiver 110 in FIG. 1) must "wake up" before every non-contiguous block 401 and transmit a portion of its packetized data during that time. Each "wake up" requires powering up the transmitter. Additionally, segmenting data transmission over a large number of non-contiguous blocks 401 increases the risk of overhead. Overhead can be, for example, MAC inter-frame space (IFS), retransmissions and scheduling delay at the end of a block if there is not enough time to transmit, a transmitter will have to wait for a subsequent block to send its entire packet.

Figure 5:
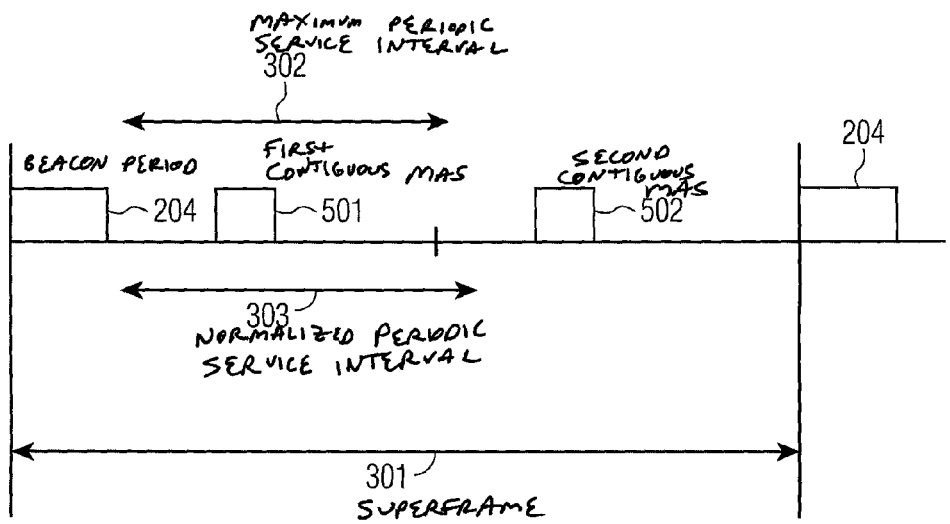
FIG. 5 is superframe with data transmitted over fewer non-contiguous MAS.

To maximize power saving performance without compromising on the QoS requirement of the application stream, a subset of the blocks within periodic service interval 205 can be used and data can be transmitted in contiguous blocks. This selection of a period of time below service interval allows for the selection of contiguous MAS during which data transmission can occur. FIG. 5 depicts a superframe 301 where data transmission occurs over contiguous MAS 501 and 502. In this example, a transmitter may only "wake up" two times to send the same amount of data as the superframe 301 of FIG. 4. This enables a substantial power savings.

In order to accomplish a balance between QoS requirements of an application stream and the desire to transmit data over contiguous MAS a determination must be made of a service interval that can accommodate both requirements. There are at least two examples of methods applicable to specific MAC protocols that can be used to select a subset of the periodic service interval. This process of selecting a subset of the periodic service interval can be construed as a normalization process.

Figure 3:
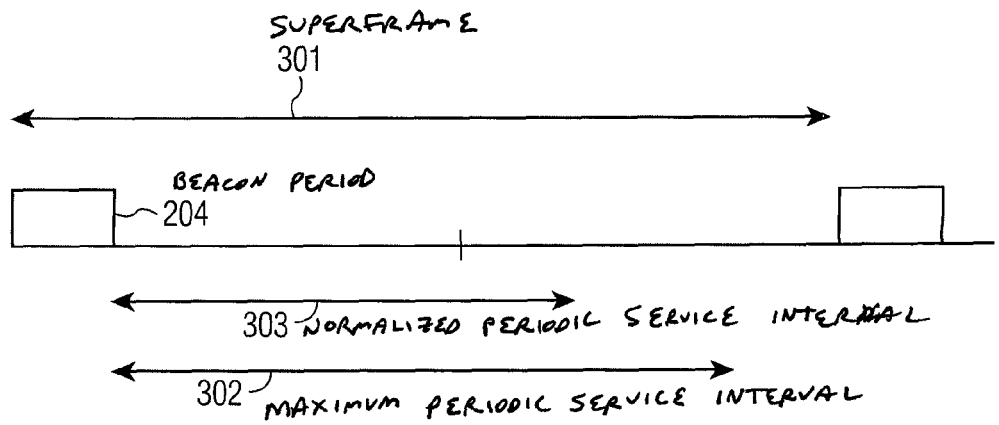
FIG. 3 is a superframe in accordance with an example embodiment.

First, for non-slot based MAC protocols such as IEEE 802.11 WLANs, the periodic service interval is normalized to fit within the superframe of the specific MAC. This may be accomplished, for example, by determining maximum amount of time less than the superframe that is allowed in order to accommodate the bandwidth and latency requirement specified in TSPEC of the application stream. For example, in FIG. 3, assume that superframe 301 equals 100 ms. The normalizing function divides the superframe 301 by the smallest integer that allows a normalized periodic service interval 303 to be less than or equal to the maximum periodic service interval 302. So if the maximum periodic service interval 302 is 60 ms, the normalized periodic service interval 303 may be, for example, 50 ms. This allows for maximization of contiguous MAS for data transmission to minimizing the overhead risk while satisfying the latency requirement. For slot based MAC protocols such as WiMedia UWB MAC 1.0, the normalized periodic service interval 303 of FIG. 3 can be a multiple of slot time. Normalizing the maximum periodic service interval can be accomplished, for example, by dividing the superframe by the smallest integer that is both $2^n$ where n={0 . . . ∞} and allows the normalized periodic service interval to be less than or equal to the maximum periodic service interval and select such an integer.

Following normalization of the maximum periodic service interval 302, a transmitter determines a continuous period of MAS within the normalized periodic service interval 303. This may be accomplished by making reservation during the beacon period 204 or data transfer period 206 using the Distributed Reservation Protocol (DRP), as defined in WiMedia UWB MAC 1.0 or by any other known means of selecting MAS for data transfer in a superframe. Subsequently the transmitter will transmit data during the selected MAS.

Figure 6:
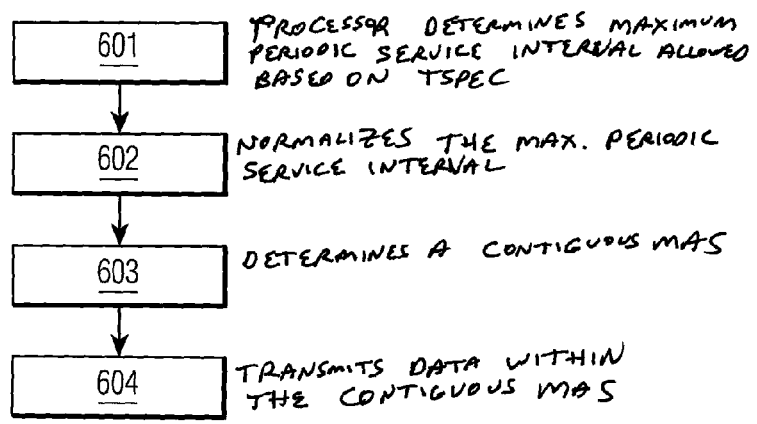
FIG. 6 is a method of transmitting information over a wireless network.

FIG. 6 depicts a flow-chart diagram of the method of transmitting information over a wireless network. In step 601, a processor determines a maximum periodic service interval allowed based on a traffic specification (TSPEC) including a delay requirement, and local resource of the device. In step 602 the processor normalizes the maximum periodic service interval to generate a normalized periodic service interval based, at least in part, on a parameter of the MAC protocol that the device is running, e.g., whether the MAC protocol is slot-based. In step 603, the processor determines a contiguous MAS within the normalized periodic service interval. In step 604 the processor transmits data within the contiguous MAS.

In view of this disclosure it is noted that the various methods and devices described herein can be implemented in hardware and software known to achieve efficient medium access and sharing in a distributed wireless network. Further, the various methods and parameters are included by way of example only and not in any limiting sense. In view of this disclosure, those skilled in the art can implement the various example devices and methods in determining their own techniques and needed equipment to affect these techniques, while remaining within the scope of the appended claims.

The invention claimed is:

1. A method of transmitting information over a wireless network comprising a wireless device, the method comprising:
    determining a maximum periodic service interval allowed based on a Traffic Specification (TSPEC) including a latency requirement of an application stream, and local resource of the wireless device;
    normalizing the maximum periodic service interval to generate a normalized periodic service interval;
    determining a continuous period of medium access time within the normalized periodic service interval; and
    transmitting information within the medium access time, wherein normalizing the maximum periodic service interval allowed further comprises dividing a superframe by a smallest integer that allows the normalized periodic service interval to be less than or equal to the maximum periodic service interval.

2. The method of claim 1, wherein normalizing further comprises: dividing the superframe by the smallest integer that is $2^n$ where n={0 . . . infinity}, such that it allows the normalized periodic service interval to be less than or equal to the maximum periodic service interval.

3. The method of claim 1, wherein determining a maximum period service interval further comprises:
    determining a maximum periodic service interval for each application stream based on the Traffic Specification (TSPEC), including delay requirement, and local resource for each stream; and
    selecting the minimum of a plurality of said maximum periodic service intervals of all concurrent application streams.

4. A wireless network comprising:
    a plurality of wireless devices, said wireless devices each comprising:
        a transmitter for transmitting a signal;
        a receiver for receiving the signal;
        a processor; and
        a power source;
    wherein the processor comprises means for determining a periodic service interval based on a Traffic Specification (TSPEC) including a delay requirement of an application stream, and local resource of the wireless devices; means for normalizing the maximum periodic service interval to generate a normalized periodic service interval; means for determining a continuous period of medium access time within the normalized periodic service interval; and means for instructing the transmitter to transmit data within the medium access time, wherein the means for normalizing the maximum periodic service interval includes means for dividing a superframe by a smallest integer that allows the normalized periodic service interval to be less than or equal to the maximum periodic service interval.

5. A wireless device comprising:
    a transmitter for transmitting a signal;
    a receiver for receiving the signal;
    a processor; and
    a power source;
    wherein the processor comprises means for determining a periodic service interval based on a Traffic Specification (TSPEC) including a delay requirement of an application stream, and local resource of the said wireless device; means for normalizing the maximum periodic service interval to generate a normalized periodic service interval; means for determining a continuous period of medium access time within the normalized periodic service interval; and means for instructing the transmitter to transmit data within the medium access time, wherein the means for normalizing the maximum periodic service interval includes means for dividing a superframe by a smallest integer that allows the normalized periodic service interval to be less than or equal to the maximum periodic service interval.

* * * * *